United States Patent [19]

Hummel

[11] Patent Number: 5,831,982
[45] Date of Patent: Nov. 3, 1998

[54] METHOD FOR FORMING ROUTING INFORMATION IN AN ATM COMMUNICATION NETWORK

[75] Inventor: Heinrich Hummel, Bergkirchen, Germany

[73] Assignee: Siemens Aktiengesellschaft, Munich, Germany

[21] Appl. No.: 768,172

[22] Filed: Dec. 17, 1996

[30] Foreign Application Priority Data

Dec. 21, 1995 [EP] European Pat. Off. .............. 95120259

[51] Int. Cl.[6] .............................. H04L 12/24; H04L 12/56
[52] U.S. Cl. ............................................. 370/396; 370/351
[58] Field of Search ..................................... 370/395, 396, 370/397, 409, 905, 907, 355, 392, 351, 238, 400, 410

[56] References Cited

PUBLICATIONS

Computer Networks and ISDN Systems, vol. 12, No. 1, Aug. 1986, A.E. Baratz, Establishing Virtual Circuits in Large Computer Networks, pp. 27–37.
Computer Communication Review, vol. 25, No. 2, Apr. 1995, W.C. Lee, Topology Aggregation For Hierarchical Routing in ATM Networks, pp. 82–92.
Computer Communication Review, vol. 7, No. 1, Jan. 1977, C.A. Sunshine, Source Routing in Computer Networks, pp. 29–33.
IEEE Journal on Selected Areas in Communication, vol. 7, No. 8, Oct. 1989, V.R. Saksena, Topological Analysis of Packet Networks, pp. 1243–1252.
ATM Forum 94–0471R14, Appendix H: Route Generation Algorithm, pp. 314–321.

*Primary Examiner*—Ajit Patel
*Attorney, Agent, or Firm*—Hill & Simpson

[57] ABSTRACT

For the connection setup between output switching nodes and a target switching node of an ATM communication network consisting of subnetworks, a best route, as well as the relevant routing information, is determined such that alternate routes are also taken into account. The alternate routes are thereby loops via one or several further subnetworks to a not-yet-passed reentry node of the already-passed subnetwork. The method is particularly suited for ATM communication networks whose signaling takes place according to the PNNI protocol.

8 Claims, 3 Drawing Sheets

METHOD FOR FORMING ROUTING INFORMATION IN AN ATM COMMUNICATION NETWORK

BACKGROUND OF THE INVENTION

If, in an ATM communication network operating according to the principles of the PNNI protocol of the ATM forum (ATM Forum Technical Committee Private Network-Node-Interface (PNNI) Specification, Version 1.0), an output switching node S (S for "source node") receives a connection setup message from a terminal apparatus connected to it, a routing information must be determined in it for the entire route through the network up to the target switching node D (D for "destination node"), to which the desired target connection terminal apparatus is connected or to which a connection transition into another network is to be carried out, and this routing information is added in PNNI protocol form to the connection setup message before forwarding to the subsequent switching nodes.

The above-mentioned ATM communication networks can be structured into numerous subnetworks ("peer groups"), consisting of physical switching nodes and physical links. According to the PNNI protocol, the nodes of a {hierarchically lowest) peer group determine from among them what is called a representative node ("peer group leader"), which represents the entire peer group in the form of a single logical model node (called a "logical group node" or also a "parent node") in a hierarchically higher peer group. A hierarchically higher peer group is formed from several parent nodes of this type, as well as the links networking these, whereby such a link ("logical link") represents a logically formed subset of all those physical links that connect each two boundary nodes of the two adjacent (hierarchically lower: "child") peer groups with one another, and were provided with an identical identification (called an "aggregation token") by administration.

The hierarchy can continue recursively in further hierarchy levels: in the hierarchically higher peer group as well, a peer group leader selection can again take place. The peer group leader thereby selected again represents the entire hierarchy region built up under it in a hierarchically next-higher peer group, as if this hierarchy region were a single node. In this peer group there are again logical, model links between each two neighbor nodes, whereby such a link again represents all those physical links that are each bounded by a physical switching node in the adjacent hierarchy regions.

The hierarchical model network according to the PNNI protocol (for the view: 3-dimensional grid) is completed by the addition of further purely logical links, called "uplinks," which connect each two nodes (physically—in case the node at the lower end of the uplink is a physical node—or logically) from peer groups of different hierarchy levels with one another according to the PNNI protocol.

Thus, from the boundary node of a hierarchically lowest peer group that is connected with a boundary node in an adjacent peer group via a physical link, an uplink (also called "initial uplink" below) leads to a representative node, called the "upnode," i.e. to that representative node "ancestor node" (i.e. parent node, or, respectively, "grandparent node," or, respectively, grand . . . grandparent node) of the adjacent boundary node that is an immediate neighbor node to exactly one determined ancestor node of the boundary node on this side in a common hierarchically higher peer group. An uplink of this sort (initial) has the consequence that all ancestor nodes (of the boundary node on this side), which however each belong to a hierarchically lower peer group than the aforementioned common hierarchically higher peer group, each also contribute an uplink (also called an "induced uplink" below) to the aforementioned upnode to the hierarchy diagram.

The hierarchical structuring, which finally rests on corresponding configuration data of the individual nodes, can thereby be handled very flexibly. In particular, the individual nodes of a grand . . . grandparent peer group can have different numbers of subhierarchy levels together with relevant peer groups.

The exchange of data packets ("hello packets") according to the PNNI protocol, as well as PNNI topology state packets, or PTSPs, via what are called routing control channels, ensures that each physical switching node of a hierarchically lowest peer group acquires the same knowledge concerning the topology of this peer group and of all peer groups located higher in the hierarchy, including all uplinks, and also the same knowledge concerning the occupancy loading of all nodes and links contained therein, as well as the same knowledge concerning the characteristics thereof (availability, capacities, features, costs).

The topological knowledge gained can be stored in a node in the form of a graph G1. In it, the respectively current switching node (the one that has determined this graph G1 for itself) is particularly marked as an output node S.

If a terminal apparatus connected to an output node now expresses the desire to be connected with the terminal apparatus at a particular target address, the data in the graph G1, exchanged per the PNNI routing protocol, permit the determination of that target node D that proclaims the availability of the target terminal apparatus and thereby belongs to the hierarchically lowest possible peer group.

However, in the specification, version 1.0, appendix H, the ATM Forum Technical Committee Private Network Node Interface (PNNI) does not thereby provide the possibility of also including advantageous alternate routes via one or several peer groups, with return to the already-passed peer group, in the routing search; it is thus sometimes not possible to correspondingly fulfill a switching request.

SUMMARY OF THE INVENTION

It is an object of the present invention to provide a method for determining a best possible connection path, taking into account the present occupancy load information for all nodes and links of this graph G1 and their characteristics, as well as the expressed claims of the present connection request. It is a further object to convert the determined information into a routing information in such a way that the information satisfies the PNNI protocol regulations, and thus can be given to the connection setup message on the path to the next connection node.

In general terms the present invention is a method for forming routing information in an ATM communication network consisting of switching nodes for a connection setup message from an initial switching node to a target switching node. The switching nodes are respectively allocated to subnetworks, and are networked among one another via links. Also, they are unambiguously combined to form subnetworks of higher order according to an ascending hierarchical ordering, which are again combined into sub-networks of next-higher order. All topological information is taken into account via links within the branch of the communication network hierarchy. The branch goes out from the switching node that carries out the formation of the routing information in the ascending direction in relation to the communication network hierarchy. Advantageous routing loops via one or several subnetworks of every hierarchy level having different entry and reentry switching nodes are also taken into account in such a way that links are also included in the ascending direction in relation to the communication network hierarchy by the switching node that forms the routing information.

Advantageous developments of the present invention are as follows.

The switching nodes operate according to the principles of the private network node protocol.

The formation of routing information in the output switching node includes the routing loops for a connection setup message.

The formation of routing information in a transit switching node includes the routing loops for a connection setup message.

The output switching node and the target switching node belong to the same subnetwork. The routing information is formed with the inclusion of one or several loops to further subnetworks.

The output switching node and the target switching node do not belong to the same subnetwork. The routing information is formed with the inclusion of one or several loops to subnetworks of all hierarchy levels in the course of the progress of the connection setup.

Links between subnetworks from a predeterminable hierarchy level are not taken into account for the formation of the routing information with loops, in that a common allocation symbol is determined for several links.

The routing information is structured into information elements by the original ATM switching node. An information element is determined for the first subnetwork and for each order of subnetworks included in the route.

A graph G2 is determined based on the graph G1 by removing all those nodes and links from the graph G1 that do not meet the named conditions.

An optimal connection path is subsequently determined in such a way that alternate routes via hierarchically higher peer groups are also taken into account, with subsequent return to already-passed hierarchically lower peer groups. The exit nodes and reentry nodes in one and the same peer group are thereby different; otherwise, such an alternate route would represent a completely superfluous loop, not an optimal connection path.

Although in the following there is a concentration on alternate routes, it is not to be overlooked that in the normal case, in which one best route without alternate routes is available, the inventive method also finds this route, and likewise correctly forms the corresponding alternate route information for it.

The resulting optimal route can in principle contain arbitrarily many transitions from a hierarchically higher peer group to a hierarchically lower one, and, conversely, from a hierarchically lower peer group to a hierarchically higher one, whereby at each individual transition in principle arbitrarily many, i.e. zero, one, two, . . . or n<=102 hierarchy levels can be skipped.

According to the PNNI protocol, the connection setup message is given the routing information as a sequence of information elements, called "designated transit list information elements" (DTLs), whereby a preceding information element (repeat indicator) indicates the stack-type handling of these DTLs (push and pop operations). Each information element DTL thereby contains the specification of exactly one route through exactly one hierarchical peer group in the form of one or several node-link pair indications, as well as of a counter that indicates one of these node-link pairs. The route specified by the highest information element DTL of the stack memory thereby begins with the output node S and contains only indications concerning nodes and links in the hierarchically lowest peer group, and ends if warranted with the indication of an uplink that leads to an upnode, in which the route continues in a way specified in the next-deeper stacked DTL. Each DTL located next-deeper in the stack contains indications for one route through the hierarchically next-higher peer group, whereby they begin with the indication of the relevant ancestor node of the output node, possibly followed by additional node and link indications from the same peer group and a possible uplink indication as a termination. The DTL deepest in the stack contains indications concerning a route through the hierarchically highest required peer group, beginning with the indication of the relevant ancestor node of the output node and ending at a node in whose hierarchical region the target node, with the connected target terminal apparatus, is located.

The specified organization of the DTL stack memory according to the PNNI protocol at first gives the impression that routes consisting of arbitrary sequences of hierarchically higher and hierarchically lower nodes could be left out of account, and that it would probably be indicated to fashion the algorithm for the search for an optimal connection path in such a way that routes with sequences of that type (i.e. with alternate routes via hierarchically higher peer groups) are eliminated (or separated) from the outset, as is the case in the specification of the PNNI protocol, version 1.0, appendix H.

However, the inventive method solves the representation problem of a route having alternate routes of this sort, and also forms for it alternate route information satisfying the regulations according to the PNNI protocol.

It is characteristic of the inventive solution that from a predetermined sequence of hierarchically higher and hierarchically lower nodes in which uplinks are throughout also to be passed in the reverse direction, an equivalent sequence of nodes and links is derived, which sequence never runs in descending fashion with respect to the hierarchy levels of these nodes; thus in which uplinks are never to be passed in the reverse direction. As a tribute of the one achieved in this way, one and the same hierarchically higher (logical) node can occur several times in the sequence (loops); however, on the basis of the indicated links it is unambiguously ensured that the exit and reentry boundary nodes in the relevant child peer groups are always different, which finally means that one and the same physical node is never passed more than once.

In the following, the determination of the best route in a switching node determining the route and the routing information is explained:

A graph G3 is derived from the above-named graph G2 by removing all ancestor nodes of the output node S, as well as all the (horizontal) links leading away from these that would lead from just these ancestor nodes to their neighbor nodes in the corresponding hierarchically higher peer groups, as well as all the induced uplinks leading away from these ancestor nodes in the upwards direction.

According to the PNNI protocol, e.g. using the Dijkstra routing algorithm a best route is determined from the output node S to the target node D, based on the graph G3 in a known way, whereby the uplinks remaining in the graph G3 are not to be treated differently from all the other (horizontal) links.

In general notation, a sequence F1 results as the best route:

node-n(=D), link-n-1, . . . , node-i+1, link-i, . . . , link-1, node-1(=S).

It is in the nature of the Dijkstra routing algorithm that the respective best route is determined, not only to a single determined target node D, but rather to all nodes of the network, from which the route of interest, e.g. to the target node D, is subsequently sought. By means of the Dijkstra algorithm, this route is thereby determined at first in the form of the sequence F1.

The sequence is subsequently reversed to form the sequence F2:

node-1(=S), link-1, . . . , link-i, node-i+1, . . . , link-n-1, node-n(=D).

According to its nature, the physical output node, node-1=S, is of the hierarchically lowest level. According to the invention, all other nodes can arbitrarily often be, according to sequence, hierarchically higher or hierarchically lower physical or logical nodes. In particular, the target node node-n=D need not necessarily be the hierarchically highest node among the nodes present in the sequence.

A link link-I proves to be horizontal if node-i and node-i+1 are allocated to the same hierarchy level, i.e. belong to the same hierarchical peer group. A link link-I proves to be an uplink in the upward direction (or, respectively, the downwards direction) if the hierarchy level of node node-I is smaller (or, respectively, larger) than the hierarchy level of node node-I+1.

According to the invention, a sequence F3 is derived from the sequence F2, in which (F3) the nodes in the predetermined sequence never descend with respect to their hierarchy level. Switching nodes and links of F2 are thereby replaced by others, if warranted, or are canceled. For this purpose, an auxiliary variable is used, here called CurrentNodeLevel, which is initialized with the hierarchy level of the node node-1=S, as well as a second Boolean auxiliary variable, here called BelowHighestReachedLevel, which is initialized with FALSE. In an iteration loop, all the components of the sequence F2 (the links and the nodes) are run through, beginning at the output node node-1=S, sometimes carrying out replacements or cancellations—see the following algorithm:

```
BelowHighestReachedLevel := FALSE;
current_node := node-1; //i.e. = source node S
CurrentNodeLevel := hierarchy level of the current_node;
for i:=1 step 1 to n-1 do
if hierarchy level of node-i+1 lower than
      CurrentNodeLevel then
    if BelowHighestReachedLevel = FALSE then
        determine each ancestor node of node-i+1 whose
          hierarchy level is equal to the
          CurrentNodeLevel.
        Replace link-i, which is an uplink passed in
          the downwards direction, with the associated
          horizontal link (with the same aggregation
          token).
        How this can be done: see subtask-1 following
          this algorithm.
        Replace node i+1 with the determined ancestor
          node.
        BelowHighestReachedLevel := TRUE;
    else
        strike link-i and node-i+1 from the sequence.
    end
else
    if BelowHighestReachedLevel = TRUE then
        replace link-i with that allocated (induced)
          uplink or else horizontal link that starts from
          the level given by CurrentNodeLevel and leads
          to node-i+1. How this can be done: see
          subtask-2 following this algorithm. Node-i+1
          is maintained unaltered in the sequence.
          BelowHighestReachedLevel := FALSE;
    else
        maintain link-i and node-i+1 unaltered in the
          sequence.
    end
    CurrentNodeLevel := level of node-i+1;
end
Next i;
```

Subtask-1

The associated horizontal link, in the hierarchically higher peer group, to a predetermined uplink is to be determined:

The graph G1 has m links (horizontal links and uplinks taken together). The number k from the set 1, 2, . . . , m represents a pointer to the information of interest concerning exactly one link (e.g. its identity indications). In particular, there exists a table RelationTbl with m elements. The elements represent the allocation chain from the initial uplink to the possible induced uplink, to the uplink possibly induced therefrom, etc., to the horizontal link induced therefrom in a hierarchically higher peer group:

| | |
|---|---|
| RelationTbl[$j_1$] := $j_2$; // | if there is no value k from 1 to m with RelationTbl(k) := $j_1$, $j_1$ is the initial uplink |
| RelationTbl[$J_{q-1}$] := $j_q$; | |
| . . . | |
| RelationTbl[$j_{r-1}$] := $j_r$; | |
| . . . | |
| RelationTbl[$j_{s-1}$] := $j_s$; | |
| RelationTbl[$j_s$] := 0; | | which means:
link-$j_1$ is an uplink and induces link-$j_2$
link-$j_{r-1}$ is an uplink and induces link-$j_r$
link-$j_{s-1}$ is an uplink and induces link-$j_s$
link-$j_s$ is a horizontal link.
// If there is no value $j_{s-1}$ from 1 to m with RelationTbl($j_{s-1}$):=$j_s$, but there is an entry RelationTbl[$j_s$]:=0; then $j_s$ is a horizontal link in a hierarchically lowest peer group.

Assuming that the link-i to be replaced corresponds to $j_{q-1}$, the table RelationTbl is run through until RelationTbl[$j_s$]:=0 is reached. $j_s$ identifies the horizontal link to be put in.

Subtask-2

For all m links of the graph G1 there is a table of type: LinkLevelTbl[k]=lowest hierarchy level of the two boundary nodes of the link k; for all k=1, . . . , m. link-i is designated by $j_{q-1}$. The table RelationTbl is run through from RelationTbl[$j_{q-1}$], in order to get from one link to the next link, and CurrentNodeLevel is thereby always compared with the entries in LinkLevelTbl. Assuming that the value of CurrentNodeLevel is equal to the value of LinkLevelTbl[$j_{r-1}$], $j_{r-1}$ identifies the sought link, which is to replace link-i.

From the sequence F3, a sequence F4 is formed, e.g. as follows:

```
for i: 1 step 1 to n-1 do
    if link-i = uplink then
        insert behind link-i that ancestor node of
        source node S that is of the same hierarchy
        level as node-i+1. Insert in turn behind this
        that horizontal link H that is allocated to the
        link-i on the basis of the identical
        aggregation token (run through RelationTbl
        beginning at j_i = link-i and find H = j_s).
    end
next i;
```

From F4, a sequence of DTLs is formed by fragmenting the sequence F3 behind each uplink and forming a DTL information element, of syntax in accordance with the PNNI protocol, from each subsequence produced in this way—whereby the inventive task for the output node s is completely specified.

According to the invention, the inclusion of a loop (in the sense of the inventive method, an alternate route via one or several peer groups, with return to an already-passed peer group at a not-yet-passed reentry node) can also ensue during the replenishing of the information elements of the routing information upon the arrival of the connection setup message in a physical switching node (transit node) to be passed. This is explained in the following on the basis of the reception of a connection setup message in the first physical switching node of a hierarchically lowest peer group:

If during the forwarding of a connection setup message the currently hierarchically lowest peer group is exited, the relevant DTL highest in the stack must first be removed. If a certain hierarchy region is exited at all, first all those information elements DTL highest in the stack must be removed that contain route segments through the respective peer groups of the hierarchy region to be exited. If a hierarchically lowest peer group is newly entered upon forwarding of a connection setup message, new route segments must be determined and new relevant DTLs formed. The pointers in the individual DTLs must always be set or, respectively, moved up so that during reception of a connection setup message the pointers of all received DTLs each point to a node-link pair that contains either the received physical, hierarchically lowest node or else one of its ancestor nodes.

As entry node into a further peer group, the boundary node (S') determines a new best route segment up to a target node D'. The target node D' is to be taken from the node-link pair that is subsequent to the node-link pair in the received DTL that is highest in the stack, to which the relevant pointer points.

If this is not possible because the pointer already points to the last node-link pair, the same holds in relation to the next-lower DTL in the stack, etc. It is within the scope of the invention that the PNNI protocol prescribes that the received link indication, i.e. how one arrives at the node D', must also be corresponded to completely. Each attempt to arrive there in a further improved fashion could indeed result in a better route segment, but at the same time could also lead to the hierarchy region represented by the target node D' not being entered at the provided boundary node, from which point the continuation of the connection setup could end in a blind alley. That is, in addition to D', the horizontal link Link-to-D' is also determined. Link-to-D' is taken from the node-link pair that belongs to that DTL in which D' is located and to which the relevant pointer points upon reception of the DTL.

The boundary node S', which takes into account the fact that for the present connection setup request it is only a transit node, and that the received DTL stack memory is incomplete, thus forms a possibly reduced graph G1', based on its own graph G1, as follows:

All nodes, together with bordering links, having a hierarchy level greater than or equal to the hierarchy level of the node D' are removed from the graph G1, but not D' itself, and also not those uplinks for which D' is upnode and which are thereby allocated to Link-to-D'. That is, for all uplinks that have D' as upnode, the following test is made:

As in subtask-1, a $j_{q-1}$ can be allocated to an uplink. The table RelationTbl is run through on the basis of RelationTbl [$j_{q-1}$], until an entry RelationTbl[$j_s$]: =0 is reached. If $j_s$ corresponds to Link-to-D', the uplink can remain in the graph G1'. Otherwise it is removed.

Based on G1', the graphs G2' and G3' are formed, in a manner completely analogous to the formation of the graphs G2' and G3' by the output node S, and, as specified above, a DTL stack is determined, whereby S' takes over the function of S and D' takes over the function of D (see above specification).

All the DTLs, with the exception of the very last one (which contains D') are taken over from the resulting DTL stack memory, and the DTL stack memory to be forwarded is thereby completed.

An inclusion of the above-named loops in the inventive method requires that there exist links that are connected with different boundary switching nodes of the first subnetwork or, respectively, different representatives of the subnetworks of higher hierarchy levels; only thereby do alternative routes result.

If more economical alternatives for loopless routes for a connection with the desired characteristics can be determined, routing information containing indications concerning the checked links are produced. In the inventive method, no knowledge of the network topology of the further subnetworks (peer groups), i.e. outside that of the discrete branch of the hierarchy in the switching node that carries out the formation of the route, is required. However, it is essential that at least two links be present from different boundary switching nodes of the first subnetwork to at least one additional subnetwork.

The inventive method can be realized in the output switching node if the output switching node and the target switching node belong to the same subnetwork and the routing information is formed with one or several loops to further subnetworks. The formation of routing information can thereby be carried out for a connection setup message for the first time through the output switching node for a connection setup. Alternatively, it is possible that the output switching node that forms the routing information in the sense of the inventive method is itself a transit communication system, so that the connection setup is received, and the routing information contained therein is further processed, and is further formed for the subsequent route to the target switching node.

If the output switching node belongs to a first subnetwork and the target switching node belongs to a further subnetwork, recognizable bottlenecks can likewise be avoided by including loops in the route.

It is possible not to include links between subnetworks of predeterminable higher order in the route search by using a common allocation sign for several links. This means that the inclusion of further subnetworks in the route search is limited to determined regions of the hierarchy of the ATM communication network. If it is assumed that subnetworks are structured on the basis of geographical criteria, route searches via geographically widely separated subnetworks are thereby prevented, whereby an upper limit for the resource expense, and thereby the economic expense, for a connection setup can be predetermined.

According to a further advantageous embodiment of the inventive method, the inclusion of further subnetworks can ensue in such a way that a subnetwork is exited several times, or also loops are admitted in further subnetworks, without which an implementation of the connection would not be possible with the same conditions. By means of this expansion of the test to the presence of links, connections can also be realized in which the routing resources and switching capacities of the first subnetwork are highly limited.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
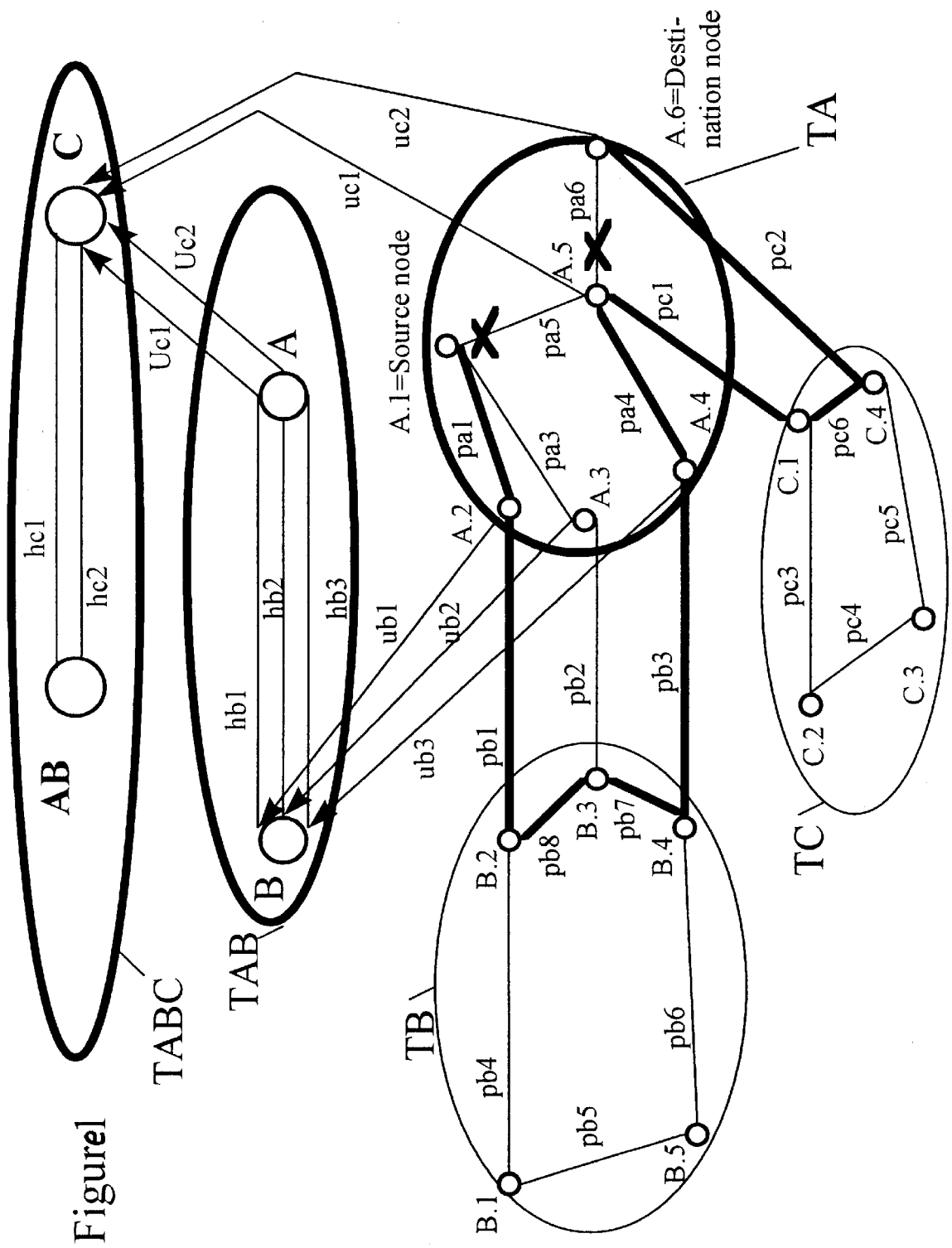
FIG. 1 shows the ATM communication network from the point of view of the output switching node A.1.
Figure 2:
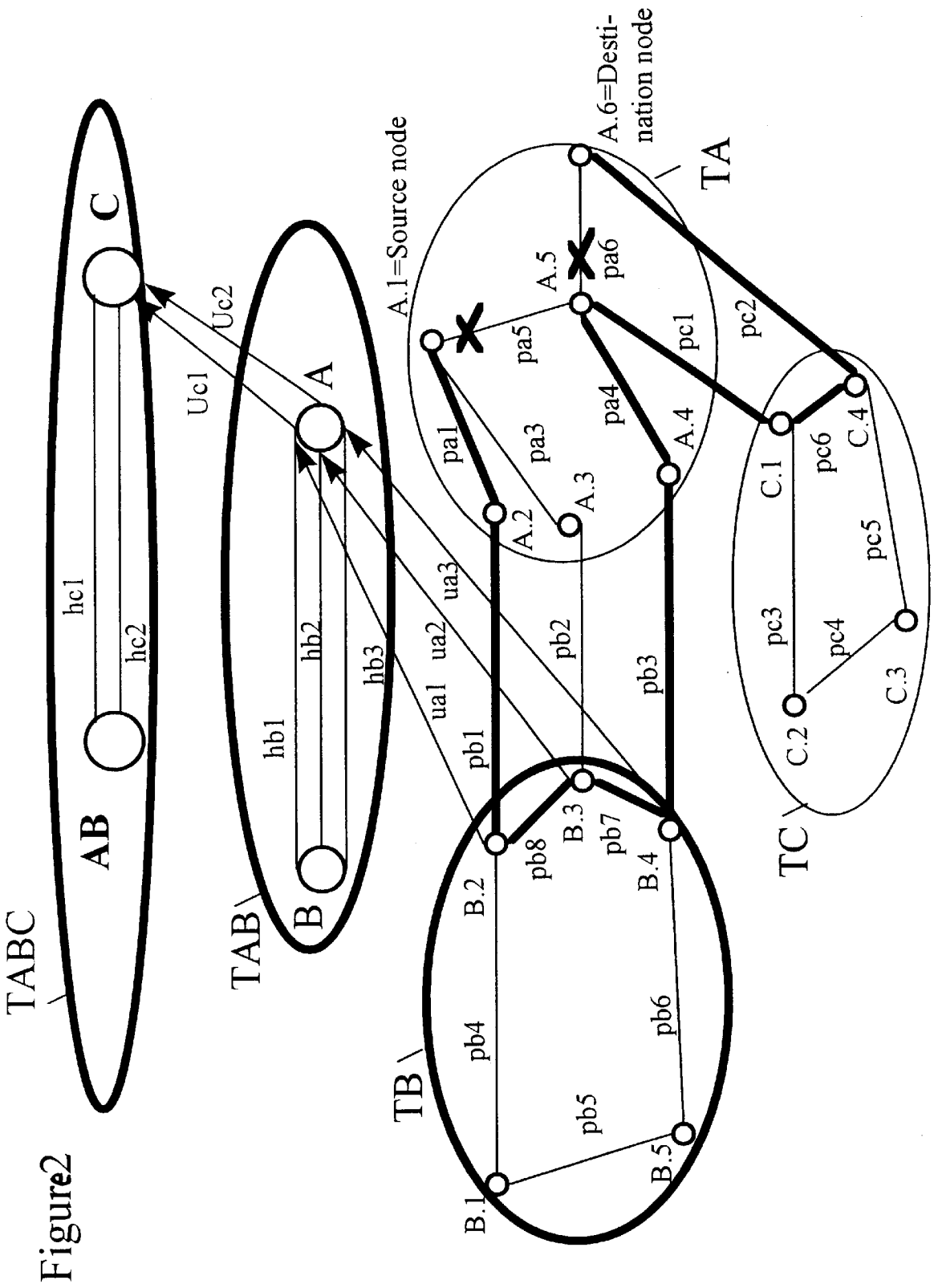
FIG. 2 shows the ATM communication network from the point of view of the transit switching node B.2.
Figure 3:
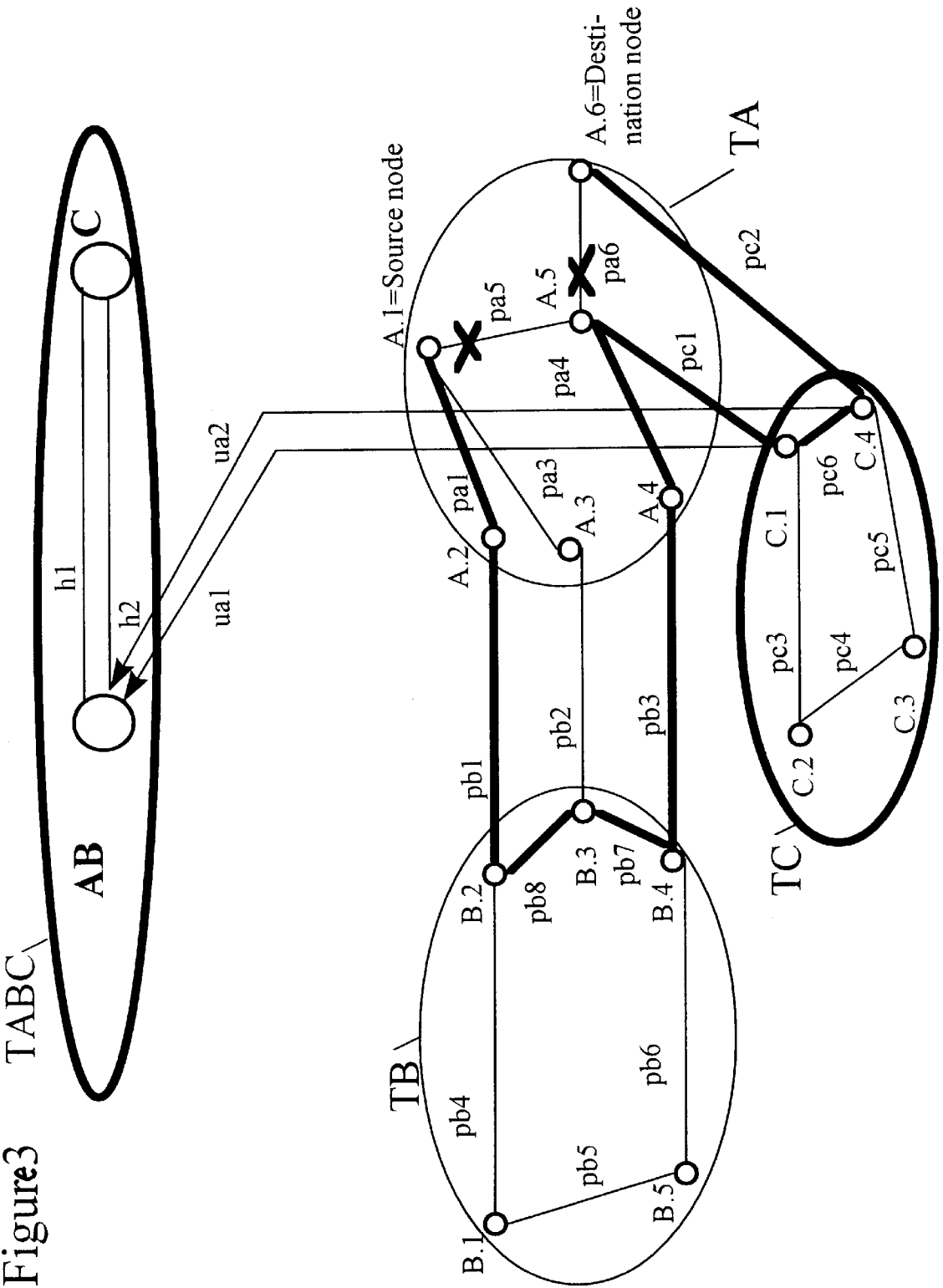
FIG. 3 shows the ATM communication network from the point of view of the further transit switching node C.1.

FIGS. 1 to 3 depict an example of the formation of the routing information in switching nodes of an ATM communication network. FIGS. 1 to 3 thereby show one and the same ATM communication network for a route search and the formation of routing information, but however seen from different switching nodes.

The hierarchy diagram of the ATM communication network shows as an example three subnetworks TA, TB, TC. The first subnetwork TA comprises the physical nodes A.1 . . . 6. For the connection setup to be considered, the node A.1 is the output switching node and the node A.6 is the target switching node. However, these output and target nodes need not be located in the same peer group (subnetwork); the use of alternate routes can also first ensue through a transit node. A further subnetwork TB comprises the nodes B.1 . . . 5, and an additional further subnetwork TC comprises nodes C.1 . . . 4. The subnetworks TA, TB (peer groups of the lowest hierarchy level) are combined into a network group TAB at a higher hierarchy level (peer group of a higher hierarchy level), and are respectively represented by means of a logical node A, B. At a still higher hierarchy level, this network group TAB (peer group) is combined with the further additional subnetwork TC to form a network group TABC, whereby a logical node AB represents the network group of the higher hierarchy level TAB and a logical node C represents the further additional subnetwork TC.

The nodes are connected among one another through physical links. Additional information are allocated to links pb1,2,3 and pc1,2 between nodes of different subnetworks.

Legend:

| Initial letter | p = phyical link |
|---|---|
| | h = horizontal link |
| | u = initial uplink |
| | U = induced uplink | pb1, hb1, and ub1, or, respectively, pb2, hb2, and ub2 or, respectively, pb3, hb3, and ub3 or, respectively, pc1, uc1, Uc1 and hc1 or, respectively, pc2, uc2, Uc2 and hc2 are for example identified with a respectively identical aggregation token.

The nodes in which the routing information is formed according to FIGS. 1 to 3 respectively see only the boldly circled peer groups (the knowledge base stored in the respective node comprises indications about these peer groups). In place of the physical links that lead out of the hierarchically lowest peer group, they see the relevantly allocated uplinks. Only the respective boundary nodes themselves know about this allocation, but do not share this knowledge with the remaining nodes of the peer group.

A route is sought from the output node A.1 to the target node A.6. The links pa5, pa6, which would allow a direct route from the output node A.1 to the target node A.6, are blocked. The physical path that the connection setup should take is drawn in in bold.

Activity of the output node A.1

Let the graph G1 be stored in the output node A.1 in the form of a list of links together with their boundary nodes, i.e.:

G1(A.1)—see FIG. 1:
(pa2: A.2, A.1), (pa3: A.3, A.1), (pa4: A.4, A.5),
(pa5: A.5, A.1), (pa6: A.6, A.5),
(ub1: A.2, B), (ub2: A.3, B), (ub3: A.4, B),
(uc1: A.5, C), (uc2: A.6, C).
(hb1: B, A), (hb2: B, A), (hb3: B, A),
(Uc1: A, C), (Uc2: A, C)
(hc1: C, AB), (hc2: C, AB),
The blocked lines are removed, i.e. (pa5: A.5, A.1), (pa6: A.6, A.5), and the graph G2(A.1) is determined:
(pa2: A.2, A.1), (pa3: A.3, A.1), (pa4: A.4, A.5),
(ub1: A.2, B), (ub2: A.3, B), (ub3: A.4, B),
(uc1: A.5, C), (uc2: A.6, C).
(hb1: B, A), (hb2: B, A), (hb3: B, A),
(Uc1: A, C), (Uc2: A, C)
(hc1: C, AB), (hc2: C, AB),
All ancestor nodes, together with bordering links, are removed, namely
(hb1: B, A), (hb2: B, A), (hb3: B, A),
(Uc1: A, C), (Uc2: A, C),
(hc1: C, AB), (hc2: C, AB),
and graph G3(A.1) is thereby determined:
(pa2: A.2, A.1), (pa3: A.3, A.1), (pa4: A.4, A.5),
(ub1: A.2, B), (ub2: A.3, B), (ub3: A.4, B),
(uc1: A.5, C), (uc2: A.6, C).
The use of the Dijkstra routing algorithm results in the sequence F1:
Destination Node D=A.6, uc2, C, uc1, A.5, pa4, A.4, ub3, B, ub1, A.2, pa2, A.1=Source Node S.
The reversed sequence=F2 runs:
Source Node S=A.1, pa2, A.2, ub1, B, ub3, A.4, pa4, A.5, uc1, C, uc2, A.6=Destination Node D.
The sequence F3 is determined:
A.1, pa2, A.2, ub1, B, hb3, A, Uc1, C, hc2, AB.
The sequence F4 is determined:
A.1, pa2, A.2, ub1, A, hb1, B, hb3, A, Uc1, AB, hc1, C, hc2, AB.

The information element of the DTL stack memory is derived therefrom. The sequence F4 is divided after each uplink, and an information element DTL, as it is sent to the next physical node, is formed from each of the resulting subsequences. The pointer points to the xth bracketed node-link pair.

1st DTL: (A.1, pa2), (A.2, ub1), pointer=2
2nd DTL: (A, hb1), (B, hb3), (A, Uc1), pointer=1
3rd DTL: (AB, hc1), (C, hc2), (AB, x'00 00 00 00), pointer=1

Activity of the transit node B.2 (entry node in the further subnetwork TB)

The transit node B.2 receives the following routing information ri:

1st DTL: (A, hb1), (B, hb3), (A, Uc1), pointer=2
2nd DTL: (AB, hc1), (C, hc2), (AB, x'00 00 00 00), pointer=1

Node B.2 has stored the network visible to it as graph G1(B.2)—see FIG. 2, circled in bold:

(pb4: B.1, B.2), (pb5: B.1, B.5), (pb6: B.4, B.5), (pb7: B.3, B.4), (pb8: B.2, B.3),
(ua1: B.2, A), (ua2: B.3, A), (ua3: B.4, A),
(hb1: B, A), (hb2: B, A), (hb3: B, A),
(Uc1: A, C), (Uc2: A, C),
(hc1: C, AB), (hc2: C, AB).

Since transit traffic is concerned here, G1'(B.2) is formed by first determining D'(B.2) and Link-to-D'(B.2):

D'(B.2)=A
Link-to-D'(B.2)=hb3.

In the transit node, all nodes from hierarchy levels greater than or equal to that of the logical node A, as well as the relevant bordering links, are removed from the graph G1(B.2), with the exception of D'(B.2)=A itself, and excepting those uplinks for which A is upnode and which are correlated with Link-to-D'(B.2)=hb3.

There results the graph G1'(B.2):
(pb4: B.1, B.2), (pb5: B.1, B.5), (pb6: B.4, B.5), (pb7: B.3, B.4), (pb8: B.2, B.3),
(ua3: B.4, A)

Since no blockings are known to the transit node B.1, graph G1'(B.2)=Graph G2'(B.2)

Since no ancestor nodes of B.1 can further be removed therefrom, G1'(B.2) G2'(B.2) G3'(B.2).

The Dijkstra routing algorithm used yields a sequence F1:
D'(B.2)=A, ua3, B.4, pb7, B.3, pb8, B.2=S'(B.2)
There results therefrom, in reverse sequence F2:
S'(B.2)=B.2, pb8, B.3, pb7, B.4, ua3, A=D'(B.2)
The operation for the formation of F3 yields no changes, i.e. sequence F2 sequence F3.

From sequence F3, sequence F4 is formed:
S'(B.2)=B.2, pb8, B.3, pb7, B.4, ua3, B, hb3, A=D'(B.2)
From sequence F4, the information elements DTLs of the routing information ri are formed:
1st DTL: (B.2, pb8), (B.3, pb7), (B.4, ua3), pointer=2
2nd DTL: (B, hb3), A=D'(B.2), pointer=1
from which the last (=second) DTL is not taken over.

The following routing information ri is thus sent from the entry node B.2 to the further node B.3 in the further subnetwork TB, in DTL stack memory format:
1st DTL, newly formed:
(B.2, pb8), (B.3, pb7), (B.4, ua3), pointer=2
2nd DTL, received and further processed:
(A, hb1), (B, hb3), (A, Uc1), pointer=2
3rd DTL, received and further processed:
(AB, hc1), (C, hc2), (AB, x'00 00 00 00), pointer=1

Activity of the transit node A.4 in the first subnetwork TA

The node A.4 receives the following routing information ri:

1st DTL: (A, hb1), (B, hb3), (A, Uc1), pointer=3
2nd DTL: (AB, hc1), (C, hc2), (AB, x'00 00 00 00), pointer=1

Node A.4 has the network visible to it stored as a graph G1(A.4), which agrees with the graph G1(A.1) stored by the output node A.1; see above and FIG. 1 (circled in bold).

Since a transit traffic is concerned, G1'(A.4) is formed by first determining D'(A.4) and Link-to-D'(A.4):

D'(A.4)=C
Link-to-D'(A.4)=hc1.

All nodes of hierarchy level greater than or equal to the hierarchy level of D'(A.4)=C, as well as the relevant bordering links, are removed from the graph G1(A.4), with the exception of D'(A.4)=C itself, and excepting those uplinks for which D'(A.4) is upnode and which are correlated with Link-to-D'(A.4)=hc1.

There results graph G1'(A.4):
(pa2: A.2, A.1), (pa3: A.3, A.1), (pa4: A.4, A.5),
(pa5: A.5, A.1), (pa6: A.6, A.5),
(ub1: A.2, B), (ub2: A.3, B), (ub3: A.4, B),
(uc1: A.5, C),
(hb1: B, A), (hb2: B, A), (hb3: B, A),
(Uc1: A, C)

The blocked links are removed, and there results graph G2'(A.4):
(pa2: A.2, A.1), (pa3: A.3, A.1), (pa4: A.4, A.5),
(ub1: A.2, B), (ub2: A.3, B), (ub3: A.4, B),
(uc1: A.5, C),
(hb1: B, A), (hb2: B, A), (hb3: B, A),
(Uc1: A, C)

If all ancestor nodes still contained, together with the links bordering thereon, are removed therefrom, graph G3'(A.4) results:
(pa2: A.2, A.1), (pa3: A.3, A.1), (pa4: A.4, A.5),
(ub1: A.2, B), (ub2: A.3, B), (ub3: A.4, B),
(uc1: A.5, C).

Using the Dijkstra routing algorithm, the following sequence F1 is therein determined as the best route from the transit node A.4 to the representative C of the additional further subnetwork TC:
D'(A.4)=C, uc1, A.5, pa4, A.4=S'(A.4)
Through the reversal of the sequence, the sequence F2 results:
S'(A.4)=A.4, pa4, A.5, uc1, C=D'(A.4)
Since the sequence F2 is never descending with respect to the hierarchy level of the occurring nodes, the operations for the formation of the sequence F3 yield no changes: F3=F2.

From the sequence F3, the sequence F4 is obtained, i.e.:
S'(A.4)=A.4, pa4, A.5, uc1, AB, hc1, C=D'(A.4)
From the sequence F4, the following information element DTLs of the routing information ri [ . . . ] derived:
1st DTL: (A.4, pa4), (A.5, uc1), pointer=2
2nd DTL: (AB, hc1), (C, x'00 00 00 00), pointer=1
from which the last (=second) DTL is not taken over.

The following DTL stack memory content is thus transmitted from the transit node A.4 to the node A.5:
1st DTL, newly formed: (A.4, pa4), (A.5, uc1), pointer=2
2nd DTL, received and further processed: (A, hb1), (B, hb3), (A, Uc1), pointer=3
3rd DTL, received and further processed: (AB, hc1), (C, hc2), (AB, x'00 00 00 00), pointer=1.

Activity of the transit node C.1 in the additional further subnetwork TC

The node C.1 recommends the following routing information ri:
1st DTL: (AB, hc1), (C, hc2), (AB, x'00 00 00 00), pointer=2.

The node C.1 has stored the network visible to it as graph G1(C.1); see FIG. 3:

(pc3: C.1, C.2), (pc4: C.2, C.3), (pc5: C.3, C.4), (pc6: C.1, C.4),
(uab1: C.1, AB), (uab2: C.4, AB)
(hc1: C, AB), (Hc2: C, AB)

Since a transit traffic is concerned, G1'(C.1) is formed by first determining D'(C.1) and Link-to-D'(C.1):

D'(C.1)=AB
Link-to-D'(C.1)=hc2.

All nodes of hierarchy level greater than or equal to the hierarchy level of D'(C.1)=AB, as well as the relevant bordering links, are removed from the graph G1(C.1), with the exception of D'(C.1)=C itself, and excepting those uplinks for which D'(C.1)=AB is upnode and which are correlated with Link-to-D'(C.1)=hc2.

There results the graph G1'(C.1):
(pc3: C.1, C.2), (pc4: C.2, C.3), (pc5: C.3, C.4), (pc6: C.1, C.4),
(uab2: C.4, AB)

Since the node C.1 does not find any blocked links (these are located in the first subnetwork TA),
G1'(C.1)=G2'(C.1).

Since no ancestor nodes relating to node C.1 can additionally be removed therefrom,
G1'(C.1)=G2'(C.1)=G3'(C.1)

Using the Dijkstra routing algorithm, the node C.1 will determine the sequence F1 as the best route:
D'(C.1)=AB, uab2, C.4, pc6, C.1=S'(C.1)

From the reversal of the sequence, the sequence F2 results:
S'(C.1), pc6, C.4, uab2, AB=D'(C.1)

Since the sequence F2 is never descending with respect to the hierarchy level of the occurring node, the operations for the formation of the sequence F3 yield no changes:
F3=F2.

From the sequence F3, the sequence F4 is obtained, i.e.:
S'(C.1)=C.1, pc6, C.4, uab2, C, hc2, AB=D'(C.1)

From the sequence F4, the following information elements DTL of the routing information ri are derived:
1st DTL: (C.1, pc6), (C.4, uab2), pointer=2
2nd DTL: (C, hc2), (AB, x'00 00 00 00), pointer=1
from which the last (=second) DTL is not taken over.

The following DTL stack is thus transmitted from the node C.1 to the further node C.4 in the additional further subnetwork TC:
1st DTL, newly formed: (C.1, pc6), (C.4, uab2), pointer=2
2nd DTL, received and further processed: (AB, hc1), (C, hc2), (AB, x'00 00 00 00), pointer=2.

Activity of the reentry node A.6 for the second reentry into the first subnetwork TA The node A.6 receives the following routing information ri:
1st DTL: (AB, hc1), (C, hc2), (AB, x'00 00 00 00), pointer=3.

To the extent that node A.6 recognizes that the target terminal apparatus is immediately connected to it, it transmits the connection setup message along the relevant UNI interface (no longer PNNI interface) to this apparatus, whereby, according to the UNI protocol, no information elements DTLs are also given. The route is closed.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for forming routing information in an asynchronous transfer mode (ATM) communication network consisting of switching nodes for a connection setup message from an initial switching node to a target switching node, comprising the steps of:

allocating the switching nodes to subnetworks, and networking the switching nodes together via links, and unambiguously allocating the switching nodes to subnetworks according to an ascending hierarchical ordering, subnetworks of a lower order in the hierarchical ordering being allocated into further subnetworks of a next-higher order, the number of subnetworks in a higher order of subnetworks being less than the number of subnetworks in a lower order of subnetworks;

taking into account all topological information regarding links within a branch of the communication network hierarchy, the branch going out from a switching node that carries out formation of the routing information in an ascending direction in relation to the communication network hierarchy;

also taking into account advantageous routing loops via at least one the subnetworks of higher order and next higher order of every hierarchy level having different entry and reentry switching nodes such that links are also included in the ascending direction in relation to the communication network hierarchy by the switching node that forms the routing information; and forming routing information using at least the topological information and the routing loops.

2. The method according to claim 1, wherein the switching nodes operate according to the principles of the private network node protocol.

3. The method according to claim 1, wherein the formation of routing information in the initial switching node includes the routing loops for a connection setup message.

4. The method according to claim 1, wherein formation of routing information in a transit switching node includes routing loops for a connection setup message.

5. The method according to claim 1, wherein the initial switching node and the target switching node belong to a common subnetwork, and wherein the routing information is formed with inclusion of at least one loop to other subnetworks.

6. The method according to claim 1, wherein the initial switching node and the target switching node belong to different subnetworks, and wherein the routing information is formed with inclusion of at least one loop to subnetworks of all hierarchy levels during connection setup.

7. The method according to claim 1, wherein links between subnetworks from a predetermined hierarchy level are not taken into account for the formation of the routing information with loops, in that a common allocation symbol is determined for several links.

8. The method according to claim 1, wherein the switching nodes operate according to the principles of the private network node protocol, and wherein the routing information is structured into information elements by an original ATM switching node, whereby information elements are respectively determined for a first subnetwork and for each order of subnetworks included in the route.

* * * * *